Oct. 31, 1939.　　　R. K. LEE　　　2,177,897
MOTOR VEHICLE
Filed Dec. 4, 1936　　4 Sheets-Sheet 1
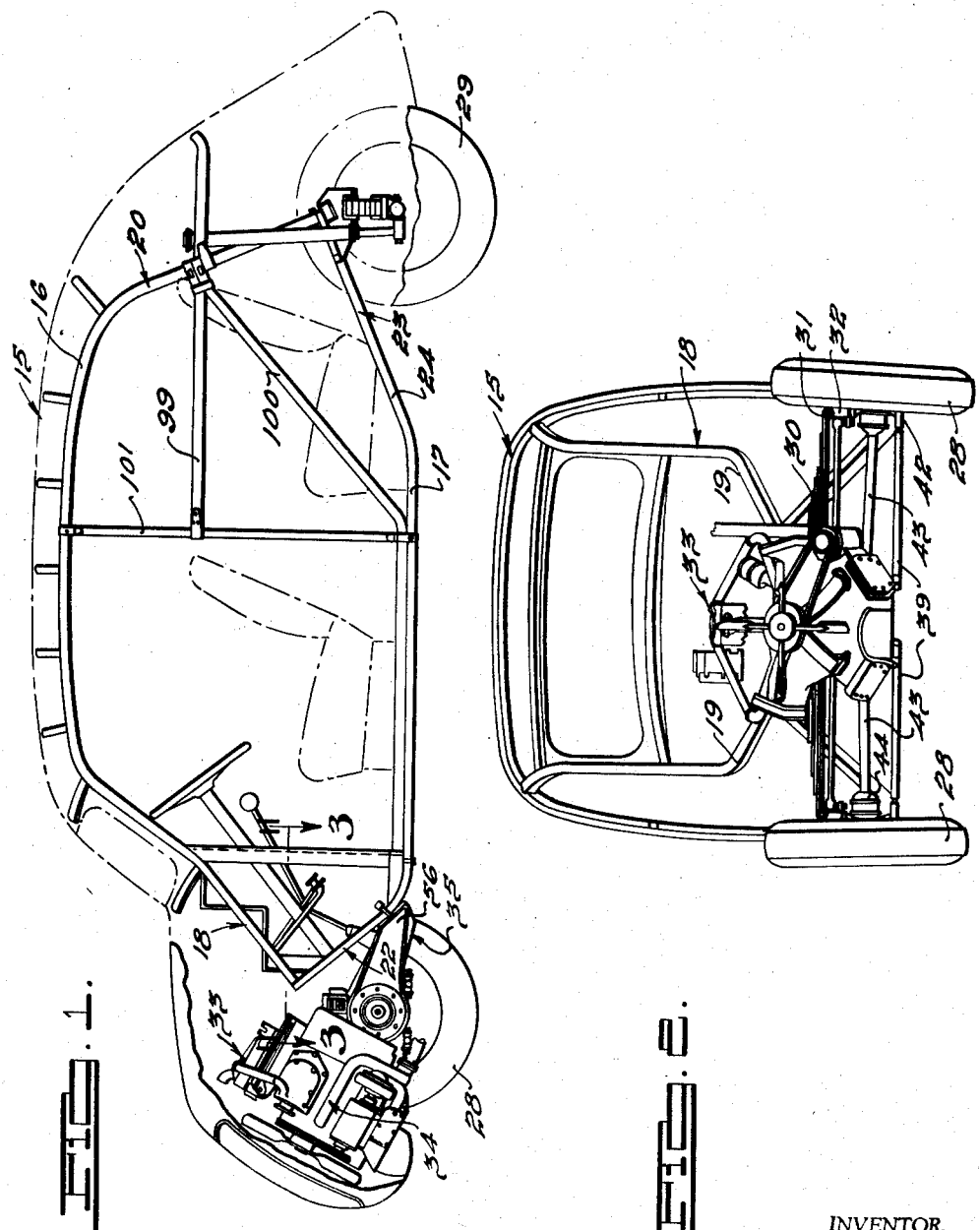
INVENTOR.
Roger K. Lee.
BY
Harness, Dind, Pates & Harris
ATTORNEYS.

Oct. 31, 1939.　　　R. K. LEE　　　2,177,897
MOTOR VEHICLE
Filed Dec. 4, 1936　　　4 Sheets-Sheet 2
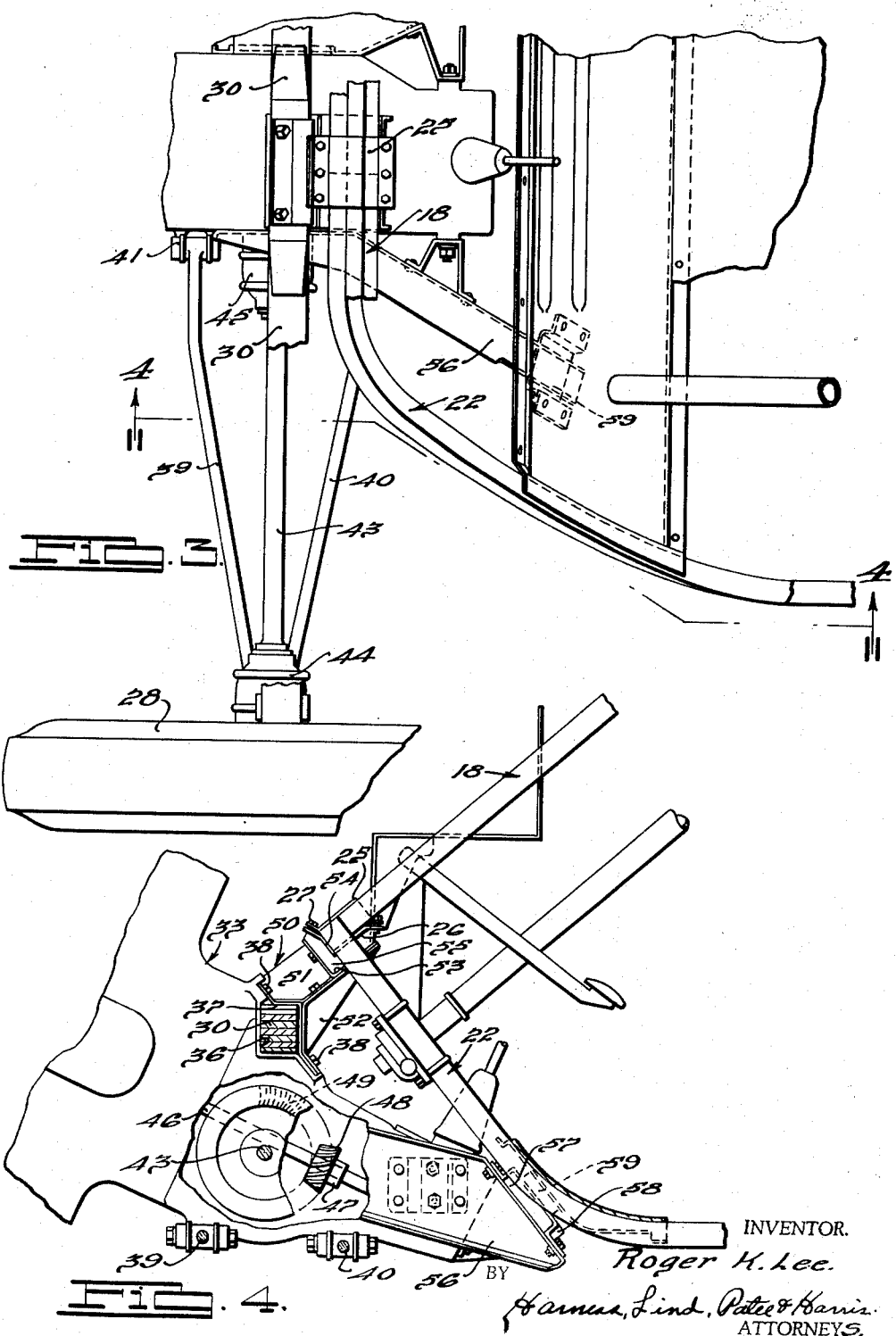
INVENTOR.
Roger K. Lee.
BY Harmon, Lind, Patee & Harris
ATTORNEYS.

Oct. 31, 1939.    R. K. LEE    2,177,897
MOTOR VEHICLE
Filed Dec. 4, 1936    4 Sheets-Sheet 3
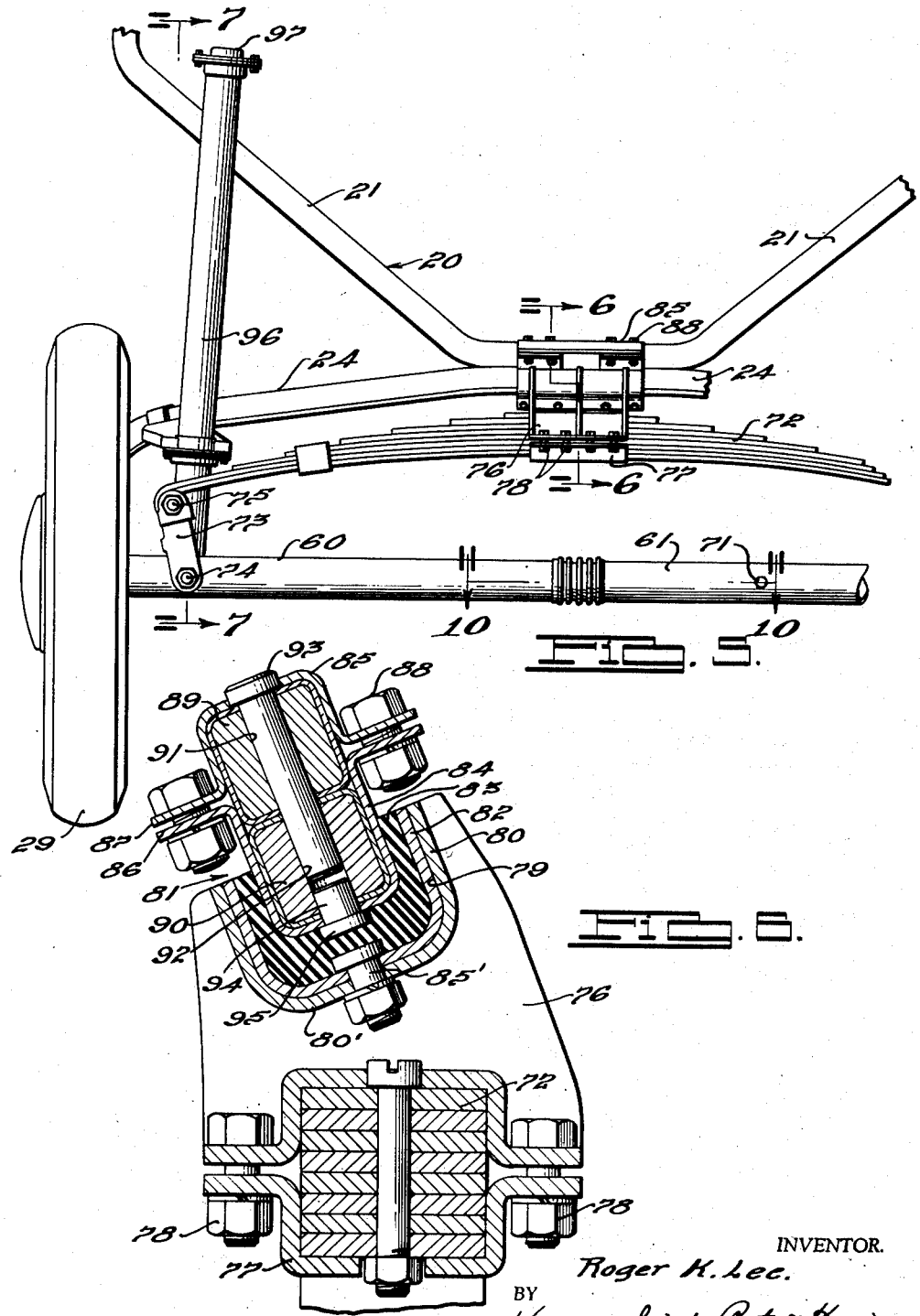
INVENTOR.
Roger K. Lee.
BY
Harness, Lind, Pate & Harris
ATTORNEYS.

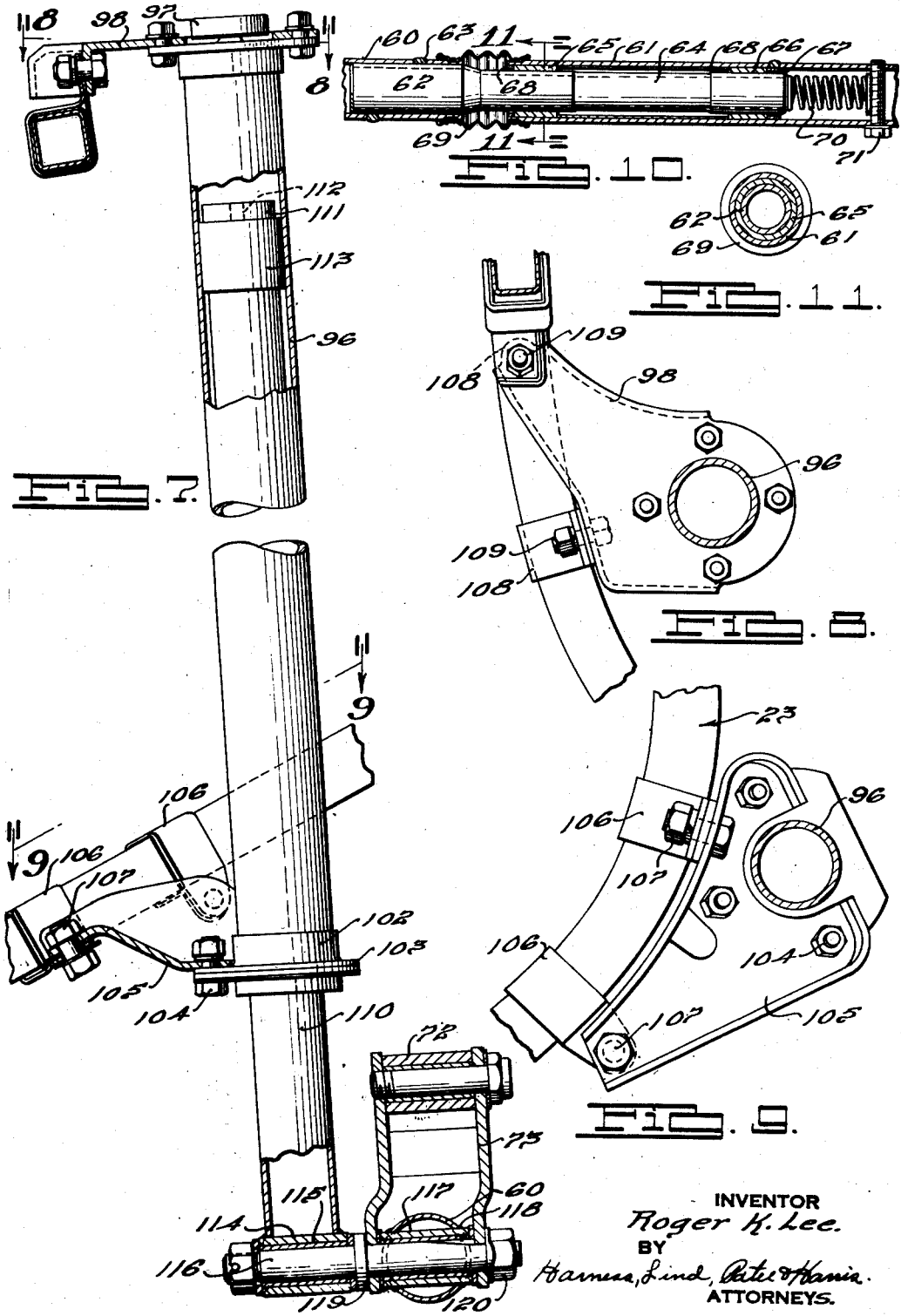

Patented Oct. 31, 1939

2,177,897

UNITED STATES PATENT OFFICE 2,177,897

MOTOR VEHICLE

Roger K. Lee, Highland Park, Mich., assignor to Chrysler Corporation, Highland Park, Mich., a corporation of Delaware Application December 4, 1936, Serial No. 114,193

15 Claims. (Cl. 280—124)

This invention relates to an improved motor vehicle.

More particularly the invention pertains to improvements in spring suspensions for motor vehicles and to improved guiding and controlling of the relative movements between the sprung and unsprung portions thereof.

The main objects of the invention are to provide in a vehicle, front and rear end spring suspension units which accommodate vertical, lateral and fore and aft movements of one of the sprung portions, of an order entirely different from the corresponding movements accommodated at the other end thereof; to provide spring suspension means which would normally permit greater freedom of movement in substantially all directions of that end of the sprung portion at which the engine of the vehicle is located than at the opposite end portion thereof; to provide movement accommodating means in the spring suspension units of both ends of the vehicle which have sound insulating properties and which are particularly adapted to insulate the body part of the sprung portion of the vehicle against sound disturbances originating from the engine and from road irregularities; and to provide improved guiding, stabilizing and rigidifying movement controlling mechanism which is adapted to coact with the end portions of the vehicle remote from its engine in compensating for the freedom of transverse and fore and aft movement freedom of both ends of the vehicle without interfering with the engine sound and vibration insulating functions of the spring suspension of the engine end of the vehicle.

Other objects of the invention are to provide improved guide means for guiding and controlling an end portion of the vehicle which accommodates substantially free vertical movement of the sprung portion of the vehicle while effectively stabilizing the latter in substantially all horizontal directions, whereby the vehicle springs are deflected mainly in the manner and directions for which they are designed; to provide stabilizing members of this character in a vehicle which coact directly between one end portion of the vehicle body frame structure and the wheel supporting axle assembly of that end portion so as to relieve the resilient member, of the associated spring suspension unit, from deflection other than that for which it is designed; to provide guide mechanism of this character which applied the wheel braking torque and other reaction derived from the road wheels directly on the body frame structure without permitting it to be transmitted through the associated vehicle spring, thereby reducing the tendency of the brakes to grab and chatter as a result of wheel braking torque promoted spring reflection; to provide stabilizing means of this kind which apply forces of the foregoing nature on the body frame structure at a location substantially at the elevation of the center of gravity of the body; to provide guide mechanism of this character which is so constructed and arranged as to be accommodated mainly in spaces of the body structure remote from the ground level of the vehicle and which spaces are not normally employed for passenger or part accommodating purposes; and to provide guiding and movement stabilizing means of this character which are so located as not to limit the minimum height of the lower extremity of the body portion or spring suspension of the vehicle from the ground level and which are so positioned as to be free from injury by the road or articles thereon, whereby the vehicle body may be underslung to a greater than conventional amount without excessively reducing the road clearance.

Still further objects of the invention are to provide an improved axle construction which is particularly adapted to facilitate free and substantially frictionless normal operation of guide members of the foregoing character when the latter are arranged to coact directly between the axle and the body portion of the vehicle; to provide extensible and contractable axle sections which are adapted to be limited in their movement by the stabilizing and guiding mechanism; and to provide means for normally urging the axle sections outwardly so as to maintain them in a loaded condition whereby chatter is avoided when such axle sections are subjected to forces tending to urge one or both of them inwardly.

Additional objects of the invention are to provide cooperating, slidably related tube and piston members between the sprung and unsprung portions of a vehicle for controlling relative movement thereof; to provide guide means of this character which are caused to coact frictionally with each other when the sprung portion of a vehicle tends to shift laterally relatively to the unsprung portion thereof, as for example, during driving of the vehicle throughout a curved course, so as to apply greater than normal opposition to vertical movement of that side of the sprung portion of a vehicle which tends to rise under such circumstances, thus to frictionally oppose side sway of the sprung portion of the vehicle during driving of the vehicle in a curved course.

An illustrative embodiment of the invention is shown in the accompanying drawings; in which:

Fig. 1 is a side elevational view of a vehicle embodying the invention and showing the vehicle construction partly in section and with portions thereof removed to disclose the underlying structure.

Fig. 2 is a front end elevational view of the vehicle shown in Fig. 1, also showing the vehicle partly in section and with portions thereof removed.

Fig. 3 is a fragmentary, horizontal, sectional view taken on the line 3—3 of Fig. 1.

Fig. 4 is a fragmentary, vertical, sectional view taken on the line 4—4 of Fig. 3.

Fig. 5 is a fragmentary rear end elevational view of the vehicle illustrated in Fig. 1, showing the construction thereof partly in section and with portions removed to disclose the underlying structure.

Fig. 6 is a fragmentary, vertical, sectional view taken on the line 6—6 of Fig. 5.

Fig. 7 is a fragmentary, vertical, longitudinal, sectional view taken on the line 7—7 of Fig. 5.

Fig. 8 is a fragmentary, transverse, sectional view taken on the line 8—8 of Fig. 7.

Fig. 9 is a fragmentary, transverse, sectional view taken on the line 9—9 of Fig. 7.

Fig. 10 is a fragmentary, horizontal, sectional view taken on the line 10—10 of Fig. 5.

Fig. 11 is a fragmentary, vertical, sectional view taken on the line 11—11 of Fig. 10.

In the form of the invention illustrated in the drawings, the vehicle comprises a body portion, generally designated by the numeral 15, which is constructed mainly of a tubular material and which comprises upper and lower frame sections 16 and 17, respectively. The upper frame section 16 has a downwardly inclined, forwardly extending, looped front end portion, generally designated by the numeral 18, comprising converging side rail members 19; and a downwardly inclined, rearwardly extending, rear looped portion, generally designated by the numeral 20 and comprising side rail members 21. The lower frame section 17 also comprises a forwardly extending looped front end portion, generally designated by the numeral 22, which is inclined upwardly into adjacent relationship with respect to the forwardmost part of the front looped end 18 of the upper frame section 16. Formed at the rear end of the lower frame section 17 is a loop, generally designated by the numeral 23, and comprising side rail members 24 and which extends into adjacent relationship to the rear extremity of the rear looped end portion 20 of the upper frame section 16.

The side rail members of the upper and lower frame sections 16 and 17 are secured together at the front end of the body structure in such a manner as to also connect together the loops 18 and 22 of the upper and lower frame sections. This is accomplished by complementary clamping brackets 25 and 26 which embrace the adjacent end parts of the side rail members of the looped extremities of these frame sections, as illustrated in Fig. 4. These clamping members are detachably secured together by bolts 27 which extend through apertures in registering ears provided along the edge portions thereof.

The front and rear ends of the body portion of the vehicle are supported on front and rear road wheels 28 and 29, respectively. The front pair of wheels 28 are pivotally connected together by a transversely disposed spring 30 having eyes at its opposite end portions pivotally secured at 31 to wheel mounting members 32, illustrated in Fig. 2, the spring 30 being disposed above the elevation of the axes of the wheels.

Mounted on the intermediate portion of the spring 30 is an internal combustion engine, generally designated by the numeral 33, which includes a radial type of internal combustion engine, generally designated by the numeral 34, and a transmission mechanism, generally designated by the numeral 35. The internal combustion engine clutch and transmission are assembled together in a unitary structure, hereinafter called the engine unit of the vehicle. The mounting of the engine unit 33 on the leaf spring 30 is clearly illustrated in Fig. 4. The casing of the clutch mechanism 35 is provided with an angular recess 36 for receiving the intermediate portion of the leaf spring 30 on which the engine is securely clamped by an angular shaped bracket 37 secured to the engine unit by bolts 38.

The front wheels 28 are stabilized by front and rear pairs of radius rods 39 and 40, shown in Fig. 3, which have inner ends pivotally attached at 41 to the engine unit and outer ends connected at 42 to the wheel mounting 32 by universal joints. A pair of power shafts 43 extending transversely of the vehicle, drivingly connects the front wheels with the engine unit. The outer end of each propeller shaft 43 is connected to its respective front wheel 28 by a universal joint 44, and its inner end is connected to the engine unit by a universal joint 45. The driving torque is transmitted from the transmission of the engine unit in the manner illustrated in applicant's copending application Serial No. 109,695 and as diagrammatically shown in Fig. 4. The crank shaft of the engine (not shown) is drivingly connected by the clutch mechanism of the engine unit with a transmission shaft 46 by which the initial driving gearing (not shown) is operated. Journalled on the shaft 46 is a tubular sleeve 47 which is operatively connected to the torque outward gearing of the transmission. The tubular sleeve 47 carries a beveled pinion 48 which meshes with and drives a bevel gear 49 from which the propeller shafts 43 are in turn driven.

The front end of the body 15 of the vehicle is mounted on the front wheel suspension in the manner illustrated in Figs. 1 and 4. A bracket, generally designated by the numeral 50, and comprising bolted together sections 51 and 52, is so constructed as to provide a recess of angular shape in which is received the angular clamping bracket 37 and the upper right hand corner portion of the leaf spring 30. The bracket 50 is securely attached to the engine unit by the bolt 38 which also serves to secure the spring clamping member 37 in place.

Formed in the upper end portion of the bracket 50 is an angular shaped recess 53 for receiving a member for yieldably attaching the front end portion of the frame structure of the body 15 to the leaf spring 30. This attaching member comprises a lower angular plate 54 which is held by a yieldable non-metallic element 55, in spaced relationship with respect to and out of metal contact with the lower clamping bracket 26 by which the adjacent front end portions of the upper and lower frame sections 16 and 17 are clamped together. The element 55 preferably comprises rubber and is preferably secured by vulcanization to the adjacent surfaces of the clamping member 26 and plate 53 respectively.

The yielding connection provided by the rubber element 55, between the engine unit 33 and body frame structure accommodates oscillatory movement of the engine unit in the manner set forth in my copending application Serial No. 114,192. Provided on opposite sides of the rear end portion of the engine unit 33 are rearwardly extending arms 56 which approach the side rails of the looped front end portion of the lower frame section 17. Between these side rails and the rear extremities of the arm 56 are disposed rubber blocks 57 and cooperating brackets 58 and 59 which are secured by bolts or other suitable means to the arms 56 and frame structure of the body respectively.

The rear wheels 29 are journalled upon the outer end of relatively axially shiftable tubular axle sections 60 and 61, illustrated in Figs. 5 and 10. A tubular extension 62 is fitted in the inner end portion of the axle section 60 which is spaced from the corresponding end of the axle section 61 as illustrated in Fig. 10. The extension 62 is welded at 63 to the axle section 60 and it is provided with a reduced end portion 64 which is slidably disposed within the inner end portion of the axle section 61. Suitable axially spaced bearings 65 and 66 are provided between the reduced end portion of the extension 64 and the inner periphery of the tubular axle section 61 to accommodate relatively free axial movements of these parts. The bearing member 66 is held against rightward movement, as viewed in Fig. 10, by an internal ring 67 which is welded to the axle section 61, and leftward movement of the bearing 66 is prevented by a sleeve 68 which bears between the latter bearing and the bearing 65. The bearing 65 is held against leftward movement, as viewed in Fig. 10, by a ring 68 which is also welded to the axle section 61. The gap between the inner end portions of the axle sections 60 and 61 is closed by a flexible boot 69 in order to prevent the admission of dirt into the interior of the axle section. As illustrated in Fig. 10, a compression coil spring 70 bears between the right extremity of the extension 64 and a bolt 71 extending diametrically through the tubular axle section 61. The spring 70 normally tends to urge the axle sections outwardly with respect to each other, thereby maintaining the rear axle under an outwardly loaded condition which prevents chattering during relative axial movement of the axle section.

The leaf spring 72 is disposed transversely of the vehicle and super-imposed vertically, substantially directly above the rear axle, as illustrated in Fig. 5. The outer end portions of the leaf spring 72 are connected by shackles 73 to the axle sections 60 and 61, respectively, the shackles 73 being pivotally mounted at 74 on the respective axle sections and pivotally attached at 75 to eyes formed at the extremities of the leaf spring 72.

Mounted on the central portion of the rear leaf spring 72 is a bracket 76 which is rigidly secured to the leaf spring by a clamping member 77 and bolts 78, as illustrated in Fig. 6. The supporting bracket 76 is provided at its upper end with a channel shaped recess 79 having side and bottom walls 80 and 80' extending substantially transversely of the vehicle. A mounting member, generally designated by the numeral 81, is provided for yieldably connecting the rear end portion of the vehicle body frame to the transverse spring 72 and rear wheel suspension in which the spring is included. This mounting member comprises a channel shaped sheet metal element 82 which is received in the recess 79 of the bracket 76 and an intermediate layer of yieldable, non-metallic material, preferably comprising rubber 83, which is disposed between the sheet metal channel 82 and a clamping member 84. The rubber layer 83 is securely attached to the adjacent surfaces of the clamping member 84 and sheet metal channel 82, preferably by vulcanization. Bolts 85' extending through the bottom wall of the sheet metal channel member 82 and having head portions disposed within the channel thereof are provided for securely attaching the channel member to the supporting bracket 76, as illustrated in Fig. 6. The clamping member 84 and a cooperating clamping element 85 are of complementary channel shape and they are adapted to receive and secure together the adjacent end portions of the tubular side rail members of the rear looped ends of the upper and lower frame section 16 and 17, respectively. The clamping members 84 and 85 are provided with outwardly extending ears 86 and 87, respectively, having apertures through which bolts 88 extend. Disposed in the interior of the end portions of the tubular side rail which are clamped together by the elements 84 and 85, are metal filler blocks 89 and 90 having apertures 91 and 92 therethrough, respectively. These apertures register with corresponding apertures in the tubular side rail members and in the clamping elements 84 and 85. A downwardly extending pin 93 is press-fitted in the aperture 91 of the filler block 89 and in the upper-most portion of the aperture 92 of the filler block 90. A pilot pin 94 extending through the aperture in the clamping element 84 and having a head portion 95 disposed between the latter and the channel-shaped sheet metal member 82, projects into the lower end portion of the aperture 92 of the filler block 90. The rear end portion of the body frame structure is detachably secured to the rear wheel suspension in the foregoing manner and may be readily detached therefrom by removing the bolt 88 which secures together the opposite parts 84 and 85 of the clamping structure.

Movements of the body portion of the vehicle relative to the unsprung portion thereof are controlled and the sprung portion of the vehicle is stabilized by movement guiding and stabilizing brace devices shown in Figs. 5 and 7. These movement stabilizing devices comprise tubular members 96 having closed upper ends 97 and they are disposed with their lengths extending in the general direction of the height of the vehicle body and rigidly secured to the frame structure thereof. The main portions of the stabilizing devices are preferably concealed in spaces at the sides of the vehicle body between the outer skin and interior trim thereof. The upper end of each tubular member 96 is rigidly mounted by a bracket 98 to one of the downwardly inclined side rail member portions which constitute one side respectively of the looped end portion 20 of the upper frame section 16. As illustrated in Fig. 1, these portions of the tubular side rails of the upper frame section 16 are structurally reinforced by converging tubular frame elements 99 and 100 provided at each side of the vehicle body. Each frame element 99 extends substantially horizontally from a vertical strut 101 braced between the upper and lower frame sections. The frame element 100 has a substantially horizontally extending portion lying adjacent the intermediate portion of the side rail of the lower frame section 17 and which is inclined upwardly therefrom at the junction of the brace member 101 and the lower frame section 17, as illustrated in Fig. 1. The adjacent ends of the frame elements 99 and 100 are rigidly clamped to the downwardly inclined side rail portion of the rear looped end of the upper frame section 19 so as to structurally reinforce that portion of the frame structure at which the upper end portion of the tubular member 96 of the stabilizing device is attached thereto. Although but only one side of the vehicle body frame structure is shown in Fig. 1, it should be understood that both sides thereof are substantially identical in construction.

Provided on the lower open end of each tubular member 96 is a collar 102 having a radial flange 103 in which apertures are formed for the reception of bolts 104 by which the tubular member 96 is secured to a bracket 105. The bracket 105 of each stabilizing device is secured to one of the portions of the tubular rail member of the frame structure which constitute the rear looped end portion of the lower frame section 17, respectively. The brackets 105 may be welded directly to the frame structure preferably at the locations of the beginning of the arcuate formations of the rear loop, or secured by clamping members 106, as illustrated in Fig. 7. When clamping members 106 are used, they preferably comprise sheet metal material which embraces the frame rail structure and which have overlapping end portions through which bolts 107 extend, the bolts 107 being also employed to secure the bracket 105 to the clamping members 106. In order to hold the bracket 105 against movement relative to the frame structure in substantially all directions, it is proposed to orient the overlapping end portions of the clamping members 106 through which the bolts 107 extend, in the manner illustrated in Fig. 9, so that the axes of the bolts 107 are disposed at substantially right angles to each other.

The upper tube supporting bracket 98 may also be welded directly to the frame structure or secured thereto by clamping members 108 having overlapping end portions provided with apertures for receiving bolts 109. In this case, as illustrated in Fig. 8, it is desirable to orient the overlapping ends of the clamping members 108 so that the bolts 109 are disposed substantially at right angles to each other. The brackets 106 and 108 may be welded to the frame structure, bolted thereto, or otherwise suitably secured in place thereon.

Although only one stabilizing device has herein been shown, it should be understood that two stabilizing devices are employed, one being disposed at each side of the vehicle and constructed and mounted in substantially identical manner. Slidably mounted in each tubular member 96 of the stabilizing devices, is a tubular piston element 110 having a closed inner extremity 111 in which is formed an air escapement orifice 112. Provided on the inner end portion of the piston element 110 is a bearing 113, comprising suitable bearing material, which reduces friction between the inner surface of the tube 96 and the piston element during relative axial sliding movement thereof.

The lower extremity of the piston element 110 is provided with a bushing 114 which extends transversely of the longitudinal axis of the piston element and which is rigidly secured thereto by welding or other suitable means. The bushing 114 is preferably provided with an internal bearing sleeve 115 in which a pin 116 is journalled. The pin 116 extends rearwardly from the location of the lower end portion of the piston element 110 and is received in a bushing 117 carried by the axle section 60, as illustrated in Fig. 7. Each axle section 60 and 61, is provided with a bushing 117 which is welded thereto, as illustrated at 118, and which is disposed substantially transversely of the longitudinal axis of the axle section. The pins 116 serve to connect the piston element 110 of each side of the vehicle pivotally to one of the axle sections 60 and 61, respectively, and also serve to pivotally support the lower end portion of the spring shackles 73. Each spring shackle 73 has a bifurcated end portion comprising two flanges provided with registering apertures for receiving the rear end portion of the pin 116, one flange of the shackle being disposed at each extremity of the bushing 117 respectively. Formed on the middle portion of the pin 116 is a collar 119 which abuts one of the flanges of the bifurcated end of the shackle 73 and against which this flange is held by a nut 120 provided on the threaded rear end of the pin 116 and disposed adjacent the other flange of the bifurcated end of the shackle.

The vehicle is provided with a brake system including wheel brake apparatus 29ª preferably associated with each wheel and operable under control of a brake pedal 30ª which is connected with the wheel brake apparatus of each wheel by conventional means (not shown).

By virtue of the foregoing construction and arrangement, both stability and control of the movement of the sprung portion of the vehicle relative to the unsprung portion thereof may be obtained mainly by the provision of stabilizing and control devices at the rear end portion of the vehicle. The particular stabilizing devices described hold the sprung portion of the vehicle against movements in unintended directions while freely accommodating the desired relative movements of these parts of the vehicle. This is accomplished, mainly independently of the springs which interconnect the sprung and unsprung portions of the vehicle and therefore these springs are not deflected torsionally or in any manner other than that for which they are designed. The stabilizing devices are of such character that they can be conveniently accommodated in those portions of the vehicle body which are not otherwise usefully employed, and they are so arranged with respect to the lower-most portions of the sprung portions of the vehicle as not to limit the road clearance. By extending the stabilizing devices in the general direction of the height of the vehicle body they are removed from the road surface and protected from injury by road irregularities.

The relative rigidity with which the improved stabilizing and movement guiding devices oppose undesired movement of the sprung portion of the vehicle enables control of this character to be applied at the rear end of the vehicle, thereby freeing the front end portion of the vehicle from such or equivalent control and stabilizing structure. The effectiveness with which stabilizing and movement control devices of this kind function, permits relatively yieldably rubber elements to be interposed between the springs and the sprung portion of the vehicle for the purpose of sound insulation without introducing excessive undesirable movement of the sprung portion relative to the unsprung portion. These stabilizing and control members also apply the wheel brake torque created during braking operation directly on the body structure without transmitting the same through the spring, thereby eliminating the chatter which results during braking operation due to yielding of the vehicle springs under the application of brake reaction torque. The brake reaction and road created influences are applied by the stabilizing means on the body structure at locations substantially at the elevation of the center of gravity of the sprung portion of the vehicle and its normal load, thus preventing any tendency of the sprung portion to rock under the action of such forces. When the sprung portion of the vehicle tends to sidesway during travel of the vehicle in a curved course the pistons of the stabilizing devices tend to depart from coaxial relationship with respect to the tubes and they coact frictionally with the sides of the tubes in which they are disposed to hold the sprung portion of the vehicle against such swaying tendency. All these advantages are accomplished while still providing for relatively free and unobstructed natural vertical movement of the sprung portion of the vehicle upon its supporting springs.

Although but one specific embodiment of the invention is herein shown and described, it will be understood that various changes in the size, shape and arrangement of parts may be made without departing from the spirit of my invention.

What I claim is:

1. A vehicle including an unsprung vehicle portion, a spring mounted thereon, a sprung vehicle portion supported at least in part on said spring, a connecting member interposed between said spring and said sprung vehicle portion including yielding non-metallic material so constructed and arranged as to accommodate relative horizontal movements of said vehicle portions, and guide means including coacting parts, one attached to each of said portions of said vehicle respectively and one of said parts being pivotally connected with its associated vehicle portion about an axis extending generally in the direction of the length of said vehicle, said guide means accommodating vertical relative movements of said vehicle portions and stabilizing said vehicle portions against horizontal movements accommodated by said connecting member.

2. A vehicle including an unsprung portion comprising a pair of wheels, a leaf spring extending transversely of said vehicle having its opposite end portions connected with each of said wheels respectively, a sprung vehicle portion supported at least in part on said leaf spring and movable vertically relative to said unsprung portion during normal deflection of said spring, and means coacting between said sprung and unsprung portions of said vehicle for holding the same against those relative movements thereof which tend to subject said spring to deflections other than normal deflection, said means freely accommodating relative vertical movements of said vehicle body portions and comprising a pair of coacting parts associated with each wheel, one pivotally connected to one of said vehicle portions and the other attached to the other vehicle portion and adapted to accommodate substantially independent substantially vertical movement of said wheels.

3. In a vehicle including an unsprung portion comprising a pair of road wheel units and including a sprung portion, mechanism for accommodating and controlling relative movements of said sprung and unsprung portions including a spring interposed transversely between said vehicle portions and having its opposite end portions connected with each of said units respectively, and an extensible brace coacting between said vehicle portions adapted to accommodate normal relative movements of said sprung and unsprung portions during normal deflection of said spring and to apply road reactions such as wheel brake torque directly on said sprung portion and substantially independently of said spring, whereby said spring is protected from deflection by said wheel brake torque, and comprising a pair of coacting parts associated with each wheel, one pivotally connected with its associated vehicle portion about an axis extending generally in the direction of the length of said vehicle, said guide means accommodating substantially independent substantially vertical movement of said wheels.

4. In a vehicle including an unsprung portion comprising a road wheel unit and a resilient member mounted thereon, a sprung portion having a body frame structure having upper and lower frame sections inclined toward each other and connected together at an elevation intermediate the upper and lower extremities of said body, means for attaching said spring to the connected portions of said frame sections.

5. In a vehicle including an unsprung portion comprising a road wheel unit and a sprung portion having a body frame structure having upper and lower frame sections inclined toward each other and connected together at an end of said body and at an elevation intermediate the upper and lower extremities of said body, and a leaf spring between said sprung and unsprung portions extending transversely of said vehicle having end portions attached to said road wheel unit and having an intermediate portion attached to the connected together portions of said frame section.

6. In a vehicle including an unsprung portion comprising a road wheel unit and a sprung portion having a body frame structure having upper and lower frame sections inclined toward each other and having side rails extending inwardly toward the longitudinal central vertical plane of said body, means connecting portions of said frame sections together substantially at the longitudinal central vertical plane of said body, and a resilient member disposed between said sprung and unsprung portions and attached to said frame structure at the connected portions of the frame sections thereof.

7. In a vehicle including an unsprung portion comprising a road wheel unit and a sprung portion having a body frame structure having upper and lower frame sections inclined toward each other and having side rails extending inwardly toward the longitudinal central vertical plane of said body, means connecting portions of said frame sections together substantially at the longitudinal central vertical plane of said body, a resilient member disposed between said sprung and unsprung portions and attached to said frame structure at the connected portions of the frame sections thereof, a leaf spring disposed between said unsprung portion and said means extending transversely of said vehicle and having end portions attached to said road wheel unit, and means for yieldably attaching the connected together portions of said frame sections to an intermediate portion of said leaf spring.

8. In a vehicle including an unsprung portion comprising a road wheel unit and a sprung portion having a body frame structure having upper and lower frame sections inclined toward each other, each section having side rail members extending inwardly toward the longitudinal central vertical plane of said body, a spring interposed between and secured to said sprung and unsprung portions respectively, and guide means coacting between said sprung and unsprung portions including a tubular member rigidly mounted on corresponding side rail members of said upper and lower frame sections and a brace member having an end portion slidably mounted in said tubular member and an opposite end portion attached to said road wheel unit.

9. In a vehicle including a body portion having a frame structure having upper and lower sections each provided at the ends of said body with inwardly extending side rail members, said side rail members of said upper and lower frame sections being inclined downwardly and upwardly respectively, clamping means securing the side rail members of both ends of said body together at the longitudinal central vertical plane of said body, a road wheel unit associated with each end of said body respectively, and a spring coacting between each road wheel unit and the associated secured together side rail members of each end of said body respectively.

10. In a vehicle including a body portion having a frame structure having upper and lower sections each provided at the ends of said body with inwardly extending side rail members, said side rail members of said upper and lower frame sections being inclined downwardly and upwardly respectively, clamping means securing the side rail members of both ends of said body together at the longitudinal central vertical plane of said body, a road wheel unit associated with each end of said body respectively, a spring mounted on each road wheel unit and located in close proximity to one of said clamping means respectively, and a connecting member between each spring, the associated clamping means including non-metallic resilient material for holding said spring and said sprung portion from metal-to-metal contact with each other.

11. A vehicle including a sprung portion, an unsprung portion comprising laterally spaced road wheels and an interconnecting axle having extensibly and contractably connected sections, one rotatably supporting each road wheel, a spring for yieldingly extending said axle sections, a transverse leaf spring disposed between said sprung and unsprung portions having one of its opposite end portions attached to each of said axle sections respectively, and a guide member coacting between each of said axle sections and said sprung portion for limiting extending and contracting movements of said axle sections.

12. A vehicle including a sprung portion, an unsprung portion comprising laterally spaced road wheels and an interconnecting axle having extensibly and contractably connected sections, one rotatably supporting each road wheel, a transverse leaf spring disposed between said sprung and unsprung portions having one of its opposite end portions attached to each of said axle sections respectively, a guide member coacting between each of said axle sections and said sprung portion including a tubular element extending in the general direction of the height of said vehicle and fixed on said sprung portion and a piston element having a comparatively close-fitting sliding engagement in said tubular element, and means for pivotally attaching each of said piston elements to one of said axle sections about an axis extending transversely of said axle.

13. A vehicle including a sprung portion, an unsprung portion comprising laterally spaced road wheels and an interconnecting axle having extensibly and contractably connected axle sections, one rotatably supporting each road wheel respectively, a resilient member coacting between said axle and said sprung portion, and an extensible brace member coacting between each of said axle sections and said sprung portion for accommodating vertical movement therebetween and limiting relative movements of said axle sections with respect to each other, said brace member including a part secured to said sprung portion and a coacting part pivotally attached to said unsprung portion about an axis extending in the direction of the length of said vehicle.

14. A vehicle including a sprung portion, an unsprung portion comprising laterally spaced road wheels and an interconnecting axle having extensibly and contractably connected axle sections, one rotatably supporting each road wheel respectively, a resilient member coacting between said axle and said sprung portion, a resilient element bearing between said sections of said axle normally urging the latter outwardly with respect to each other, and an extensible brace member coacting between each of said axle sections and said sprung portion for accommodating vertical movement therebetween and limiting relative movements of said axle sections with respect to each other.

15. In a vehicle including an unsprung portion having a road wheel unit and a resilient member mounted thereon, a sprung portion comprising a body frame structure having upper and lower frame sections inclined toward each other and connected together at an elevation intermediate the upper and lower extremities of said body, and means for attaching said resilient member to the connected portions of said frame sections.

ROGER K. LEE.